April 12, 1932. T. E. ROSS 1,853,378
HAY LOADER
Filed Sept. 24, 1927 3 Sheets-Sheet 2
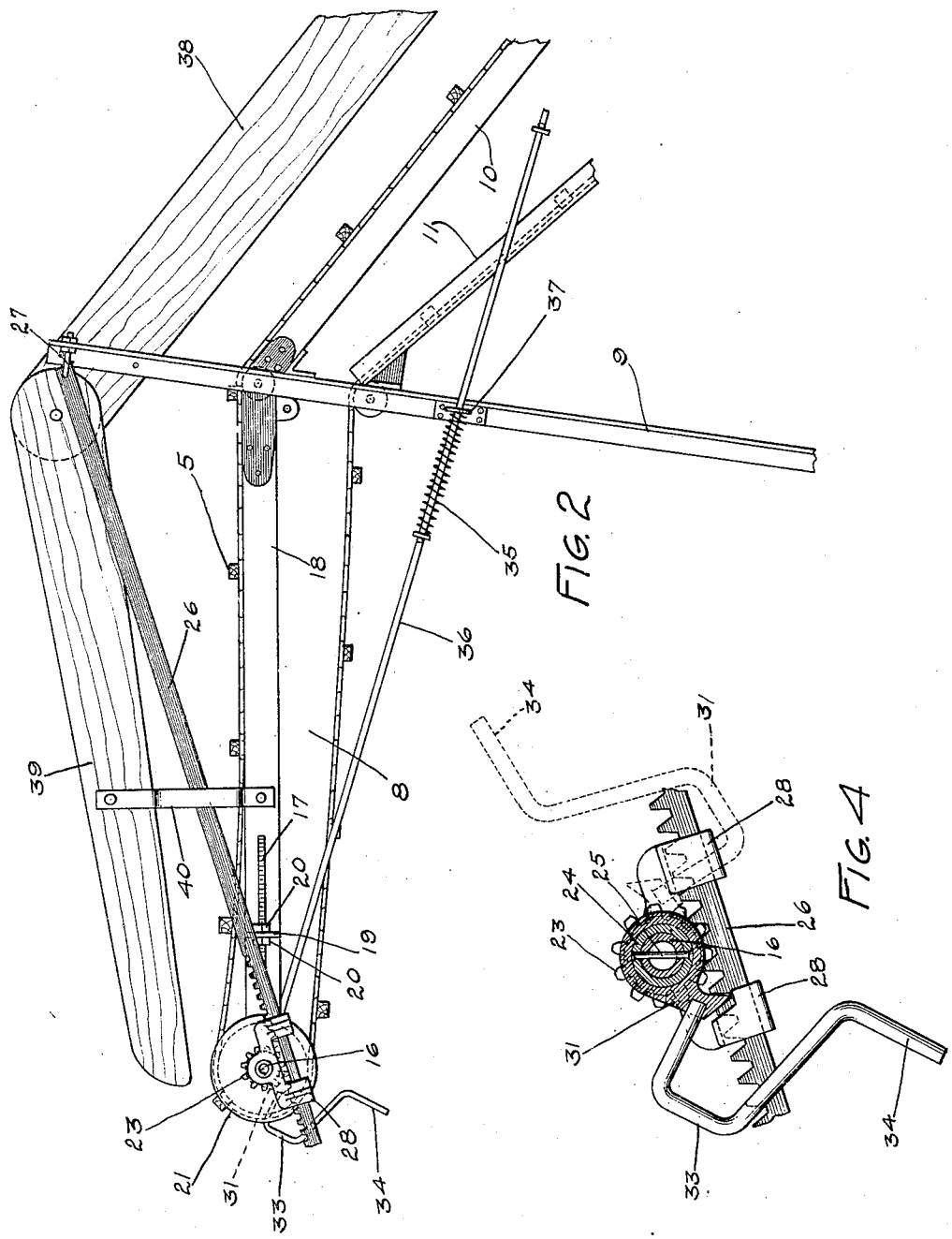
Inventor
THOMAS E. ROSS
By Paul Paul Moon
Attorneys

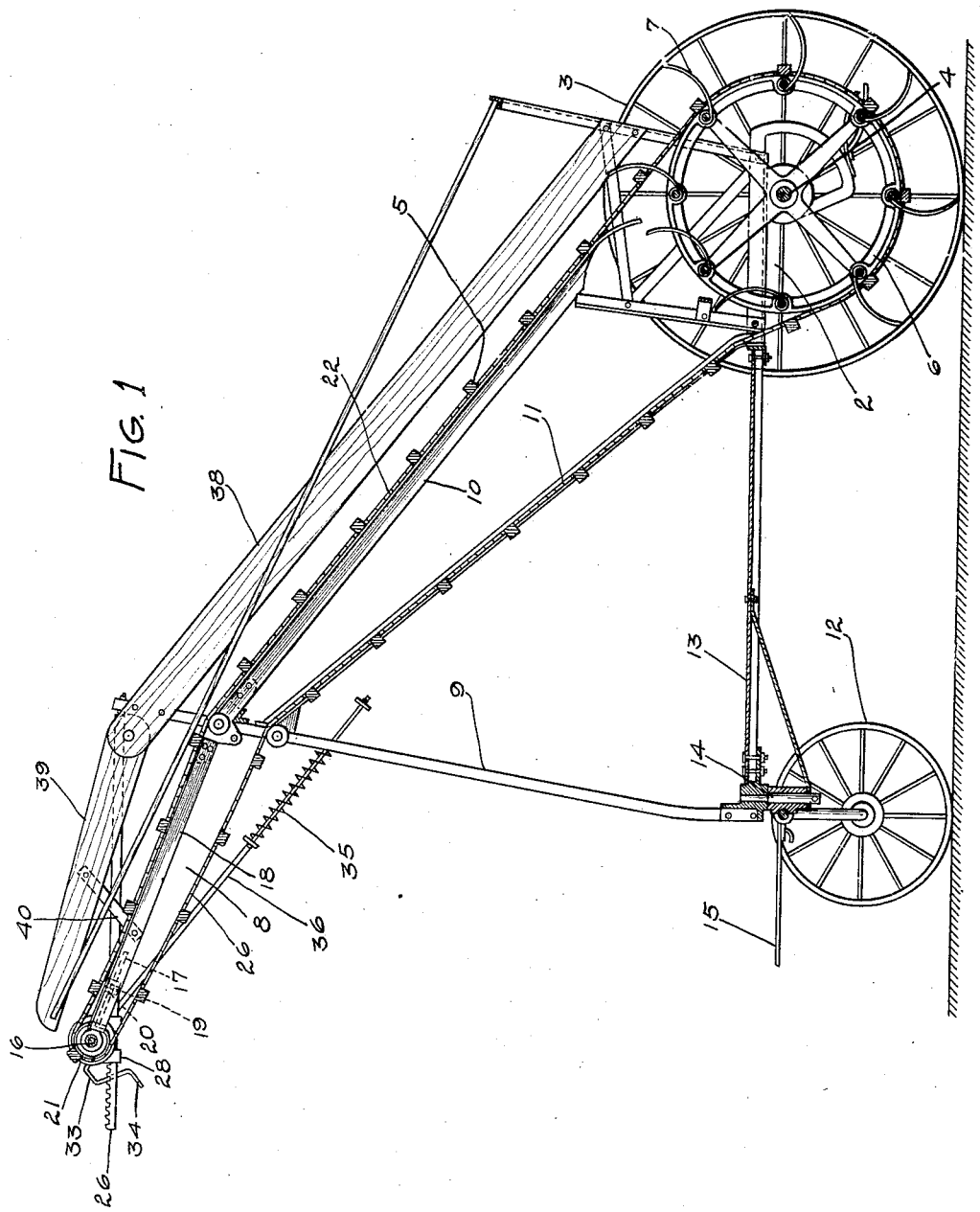

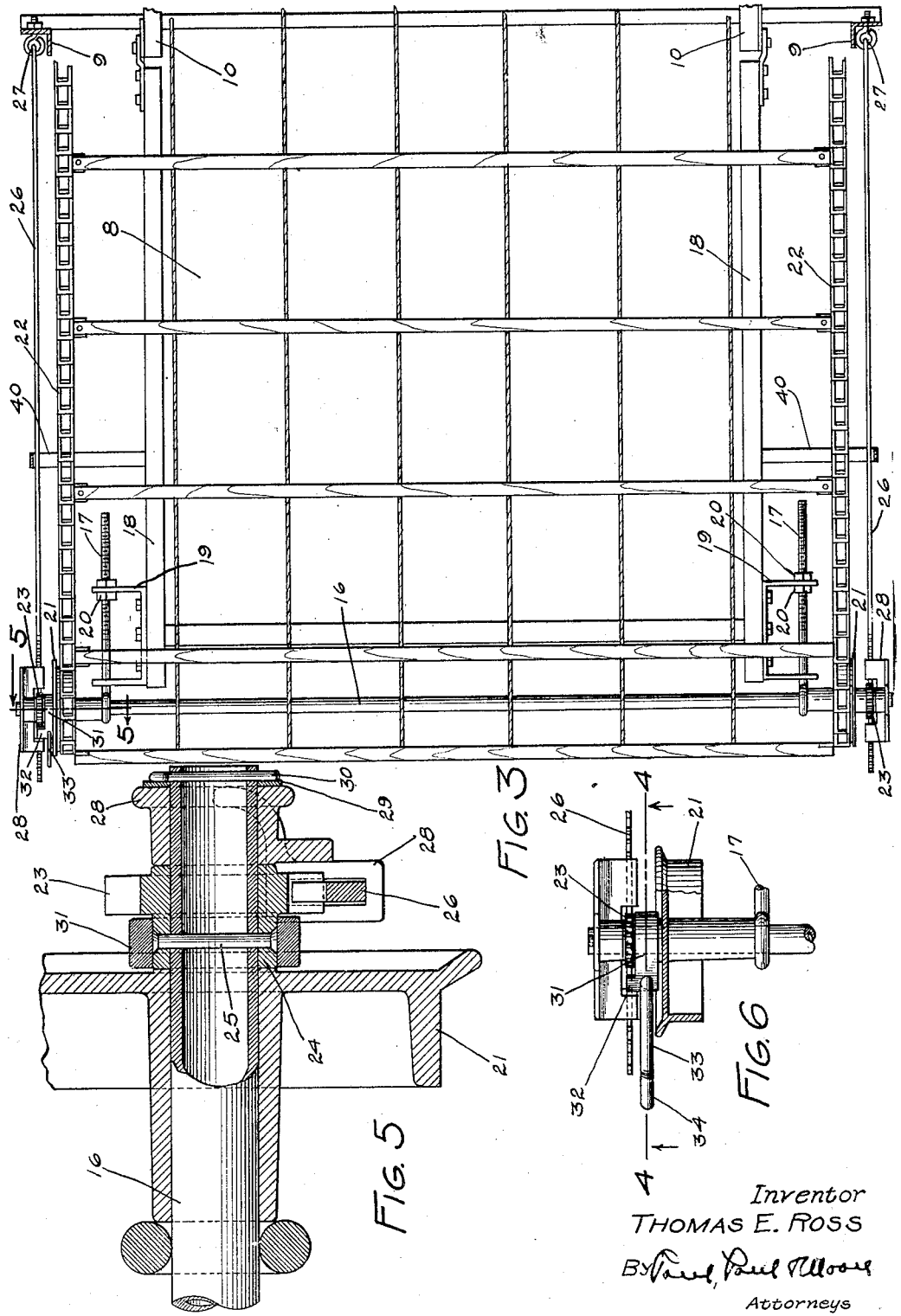

Patented Apr. 12, 1932

1,853,378

UNITED STATES PATENT OFFICE

THOMAS E. ROSS, OF STILLWATER, MINNESOTA, ASSIGNOR TO THE STATE OF MINNESOTA

HAY LOADER

Application filed September 24, 1927. Serial No. 221,805.

This invention relates to new and useful improvements in hay loaders, and more particularly to hay loaders employing an endless elevator having the delivery end thereof mounted for vertical adjustment.

An object of the invention is to provide a hay loader having a hinged delivery section provided with means for locking it in adjusted positions, said means comprising a rack bar and pinion, and having a dog for locking the pinion against relative movement in said rack bar, whereby the hinged section may be locked in adjusted positions, said dog having a lever positioned in a manner to be conveniently operated by means of a hay fork or other instrumentality, held in the hands of an operator standing in a hay wagon or on the ground adjacent to said hinged section, thereby simplifying the adjustment of the hinged section in that the latter may be raised to any of its adjusted positions or instantly lowered without the operator being required to leave his position on the wagon or ground and climb upon the loader frame to operate a lever or crank mechanism. He may raise the pivoted section or lower it by means of a hay fork if he wishes to do so while standing in one position.

Other objects of the invention reside in the novel arrangement of the rack bars and pinions supporting the outer end of the hinged elevator section, whereby the outer end thereof may be vertically adjusted without danger of binding; in the provision of the dog mounted adjacent to one of said pinions and engaging the adjacent rack bar for locking the hinged section in adjusted positions; in the lever provided upon the dog, which may be operated by being engaged by a hay fork or other instrumentality, to move the dog out of and into engagement with the rack bar, to effect the adjustment of the section; and, in the general construction and arrangement of the parts for locking the hinged section in adjusted positions.

Other objects of the invention will appear from the following description and accompanying drawings and will be pointed out in the annexed claims.

In the accompanying drawings, there has been disclosed a structure designed to carry out the various objects of the invention, but it is to be understood that the invention is not confined to the exact features shown as various changes may be made within the scope of the claims which follow.

In the accompanying drawings forming part of this specification;

Figure 1 is a vertical sectional view of a hay loader showing my invention as applied thereto;

Figure 2 is an enlarged elevational view of the upper portion of the elevator, showing the hinged section and the means provided for holding it in adjusted positions;

Figure 3 is a plan view of the hinged section;

Figure 4 is an enlarged detailed sectional view on the line 4—4 of Figure 6, showing the dog in locking position, the dotted lines indicating the position of the dog and its operating lever when in inoperative position;

Figure 5 is a detailed sectional view on the line 5—5 of Figure 3; and

Figure 6 is a sectional plan view showing the dog engaged with the rack bar.

In the selected embodiment of the invention here shown, there is illustrated in Figure 1, a conventional hay loader comprising a main frame 2 supported upon suitable wheels 3 mounted upon an axle 4. An inclined endless conveyer 5 has its lower end mounted upon a cylinder 6 having the usual hay-gathering prongs or tines 7 adapted to deliver the hay onto the upper run of the conveyer in the usual manner.

The upper end of the conveyer belt is supported upon a hinged section 8, pivotally mounted upon an upright frame member 9 as shown in Figures 1 and 2. Guide rails 10 support the upper run of the conveyer belt and similar guides 11 support the lower run. The forward end of the apparatus is supported upon wheels 12 having a pivotal connection with the frame members 9 and 13 as indicated at 14. A suitable draft member 15 is attached to the forward end of the apparatus, whereby it may be connected to a wagon or similar device.

Hay loaders of the type here shown, usually have their upper delivery or discharge end pivotally mounted so that it may be vertically adjusted to suit the height of the wagon and load. It is therefore desirable, that means be provided whereby the hinged delivery section may be adjusted with respect to the wagon while the hay loader is in operation, and, without the necessity of having to get down onto the ground or climb upon the loader to operate mechanism for vertically adjusting the delivery end of the conveyer, as in some cases, or having to operate a crank or similar device mounted at the swinging end of the hinged section.

An outstanding feature of this invention resides in the novel means provided for vertically adjusting the position of the hinged delivery section without the necessity of the operator having to stand adjacent to said section, the mechanism being so constructed and arranged that it may be actuated by being engaged with a hay fork or other instrumentality, thus permitting the operator to stand at a point remote from the discharge end of the loader as, for instance, at the forward end of the hay wagon, while he is operating or vertically adjusting the hinged delivery section of the hay loader.

A shaft 16, preferably hollow, is mounted in eye-bolts 17, adjustably secured to the frame members 18 of the hinged section 8 by means of brackets 19. The eye-bolts 17 are threaded at one end to receive adjusting nuts 20, whereby the shaft 16 may be translated longitudinally with respect to the conveyer belt, to adjust the tension thereof and to take up slack. Flanged wheels 21 are rotatably mounted upon the shaft 16 and provide supports for the chains 22 of the conveyer belt, as particularly shown in Figure 3.

Pinions 23, each having a hub 24, are secured to the shaft 16 by means of rivets 25 as shown in Figure 5. These pinions are located preferably at the outside of the flanged wheels 21. A rack bar 26 is provided at each side of the hinged section 8, each having one end pivotally connected to the upper end of the frame member 9 as indicated at 27, and the lower ends of the rack bars being guidingly supported in guide brackets 28, loosely mounted upon the shaft 16 adjacent to the pinions 23. These brackets are retained upon the shaft 16 by means of washers 29 and cotter-pins 30. The rack bars 26 constantly mesh with the pinions 23 so that when the hinged section 8 is vertically adjusted, the pinions will roll in the rack bars. As a result of the pinions 23 being secured to the shaft 16, and also that the pinions constantly mesh with the rack bars, the outer or swinging end of the hinged section may be vertically adjusted without any danger of binding, as would result if a rack bar was provided at one side only.

The means provided for locking the hinged section in adjusted positions is best shown in Figure 4, and consists of a dog 31 loosely mounted upon the hub 24 of one of the pinions 23. This dog has an off-set end portion 32 alined with its complementary rack bar 26 so that it will engage the teeth thereof as shown in Figure 6.

An operating lever or handle 33 is secured to the dog 31 and has an off-set end portion 34 normally positioned as shown in Figure 2, whereby it may be conveniently engaged with a hay fork or other instrumentality and moved to the dotted line position shown in Figure 4. When thus positioned, it will be noted by reference to Figure 4, that the dog is out of engagement with the rack bar, thus permitting the hinged delivery section of the conveyor to drop by gravity to a lower position. Compression springs 35 are provided for partially counteracting the weight of the hinged section 8 and to limit the downward movement of the latter, when the dog is moved out of engagement with the rack bar. These springs are coiled about suitable thrust rods 36, each having one end guidingly supported in the upright frame members 9 by suitable guides 37, and having their upper ends suitably connected with the outer end of the hinged section. Side boards 38 are provided at each side of the lower portion of the conveyer, and side boards 39 are pivotally connected to the upper ends thereof and have their intermediate portions supported upon pivoted arms 40, having their lower ends supported upon the side rails 18 of the hinged section as shown in Figure 2.

In Figure 1, the hinged section 8 is shown in an elevated position. When it is desired to lower the position of the hinged section, as for instance, to the position shown in Figure 2, the operator or man in the hay wagon may move the dog 31 out of engagement with its complementary rack bar 26, by thrusting his hay fork against the lever 34 and moving it upwardly until the dog is moved out of engagement with the rack bar, or, he may move it to the dotted line position shown in Figure 4, whereby the hinged section will drop to its lowermost position against the compression of the springs 35. To adjust the position of the hinged section 8 to a higher elevation, the dog is moved into engagement with the rack bar as shown in Figure 4, after which the operator may place his hay fork against the end of the hinged section and push it upwardly. When thus moved upwardly, the dog will slide over the teeth of the rack bar, and when the operator releases the section 8 the dog will engage a tooth in the rack bar and lock the hinged section in adjusted position. It will also be seen that by the employment of this novel locking mechanism, the hinged section 8 may be vertically adjusted by an operator standing on the ground, and at a point remote from the hay loader, provided, of course, that the operator has a hay fork or other instrumentality with which he can reach the dog 31 and move it out of engagement with its complementary rack bar. The outer end of the hinged section may also be moved upwardly to a higher elevation by being engaged with a hay fork, as above described. This novel locking mechanism has been found very useful in connection with hay loaders of the character described, because of the ease and convenience with which the hinged section can be adjusted by an operator standing either on the ground or at the forward end of the hay wagon, into which the hay is being delivered from the hinged delivery section 8. Hay loaders of this type are usually connected to the rear end of a hay wagon when in use, and as this is common practice, it is thought unnecessary to show the wagon in the drawings.

I claim as my invention:

1. In a hay loader, a frame, an elevator thereon having a hinged extension, a guide at the outer end of said extension, a bar having one end pivotally connected with said frame and having its opposite end portion slidably supported in said guide, means for adjustably locking said bar to said guide whereby said extension may be held in one of a plurality of working positions, and a device for rendering said locking means inoperative to cause it to release said bar, said device being adapted to be actuated from a point adjacent the outer end of said extension or from the ground to cause said extension to drop to a lower position.

2. In a hay loader, a frame, an elevator thereon having a hinged extension, bars on said frame, guides on said extension adapted to slidably receive said bars, means adapted to interlock with said bars whereby said extension may be held in one of a plurality of working positions, and a device whereby said means may be rendered ineffective as a holding means and allow said extension to drop to a lower position.

3. In a hay loader, a frame, an elevator mounted on said frame and provided with a hinged section adapted for vertical adjustment, a rack bar having one end pivotally connected with said frame and meshing with a pinion carried by said section, and means mounted upon said hinged section and adapted to engage said rack bar to lock the section in a selected adjusted position.

4. In a hay loader, an elevator provided with a hinged section, means for adjusting said section comprising a pinion mounted upon the section and a rack bar with which said pinion meshes, a dog also mounted upon said hinged section and engageable with said rack bar to lock the section in an adjusted position, and means on the dog whereby it may be moved into and out of engagement with said rack bar by means of a suitable instrumentality.

5. In a hay loader, a frame, an elevator mounted thereon and provided with a hinged section, means for relatively adjusting said section comprising a shaft carried by said section and having a pinion thereon, a rack bar connected with said frame and meshing with said pinion, a dog engageable with said rack bar to lock said hinged section in an adjusted position, and means whereby said dog may be moved out of locking engagement with said rack bar for the purpose specified.

6. In a hay loader, a frame, an elevator mounted thereon and provided with a hinged section, means for relatively adjusting said section comprising a shaft carried by said section and having a pinion thereon, a rack bar having one end pivotally connected with said frame and meshing with said pinion, a bracket mounted upon said shaft for guidingly supporting the other end portion of said rack bar, a dog engageable with said rack bar to lock said hinged section in an adjusted position, and means on said dog whereby it may be moved into and out of locking engagement with said rack bar by a suitable instrumentality.

7. In a hay loader, an elevator provided with a hinged section, means for vertically adjusting said hinged section comprising a shaft mounted on said section and having a pinion thereon, a guide bracket loosely mounted upon said shaft, a rack bar having one end pivotally supported and its other end guidingly supported in said bracket and constantly meshing with said pinion, a dog mounted adjacent to said pinion and adapted to engage said rack bar to lock the pinion against movement thereon and whereby said hinged section may be locked in an adjusted position, and a lever secured to said dog whereby said dog may be moved out of engagement with said rack bar, and may be actuated from a point remote from said hinged section.

8. In a hay loader, an elevator provided with a hinged section, means for relatively adjusting said hinged section comprising a shaft mounted on said section and having pinions secured thereto, a guide bracket loosely mounted upon said shaft adjacent said pinion, pivoted rack bars having end portions guidingly supported on said brackets and constantly meshing with said pinions, a dog loosely mounted upon said shaft adjacent one of said pinions and arranged to engage the adjacent rack bar to lock the latter against movement with respect to said pinion and to lock said hinged section in any adjusted position, a trip lever secured to said dog and normally positioned to be engaged by a suitable instrumentality whereby said dog may be moved into and out of locking engagement with said rack bar, and when out of engagement with said rack bar, allow said section to drop by gravity to a lower position.

9. In an apparatus of the class described, a main frame, an elevator having a hinged upper portion including idler wheels for the upper end of said elevator and a bearing shaft therefor extending transversely of said elevator, locking means at both sides of said main frame adjustably connecting said hinged portion relative thereto, said locking means having common operative connection through said bearing shaft.

10. In an apparatus of the class described, a main frame, an elevator having hinged upper portions and locking means at the outer end of said elevator including a locking member on said hinged portion a locking bar pivotally supported on said main frame, and having sliding engagement with said locking member, said locking member having means engageable with said locking bar in one position of rotation of said locking member and releasable by rotation of the latter into another position.

11. In an apparatus of the class described, a main frame, an elevator having a hinged upper portion including idler wheels for the upper end of said elevator and a bearing shaft extending transversely of said elevator, means for shifting said bearing shaft longitudinally of said upper hinged portion to adjust the tension of said elevator, and locking means at opposite sides of said main frame adjusting said hinged portion relative thereto, said locking means being mounted on and shiftable with said bearing shaft.

12. In an apparatus of the class described, a main frame, an elevator having a hinged upper portion, locking means on the outer end of said upper portion for selectively connecting said hinged portion relative to said main frame in alignment therewith, and having a plurality of stops automatically supporting said elevator in any one of a plurality of successive positions at lowered angles to said main frame.

13. In an apparatus of the class described, a main frame, an elevator having a hinged upper portion, a pair of locking bars at opposite sides of said main frame, and locking means on the end of said hinged portion at each side thereof selectively engaging each of said pivoted supports in a plurality of similar points for adjusting the position of said hinged portion relative to said main frame, and means connecting said locking means for simultaneous operation.

14. In an apparatus of the class described, a main frame, an elevator having a hinged upper portion, locking means at opposite sides of said upper portion adjacent the outer end thereof, locking bars pivoted at opposite sides of said main frame, each being slidably engaged and selectively adjustable relative to its respective locking member, and means for simultaneously operating said locking members.

15. In an apparatus of the class described, a main frame, an elevator having a hinged upper portion, locking means at both sides of the outer end of said upper portion selectively connecting said hinged portion relative to said main frame in alignment therewith, or in a plurality of adjusted positions at a lowered angle thereto and means connecting said locking means for simultaneous locking and unlocking operations.

In witness whereof, I have hereunto set my hand this 20th day of September, 1927.

THOMAS E. ROSS.